US009826086B2

(12) United States Patent
Zhang et al.

(10) Patent No.: US 9,826,086 B2
(45) Date of Patent: Nov. 21, 2017

(54) COMMUNICATION SYSTEM AND COMMUNICATION METHOD

(71) Applicant: SOFTBANK MOBILE Corp., Tokyo (JP)

(72) Inventors: Liang Zhang, Tokyo (JP); Takao Okamawari, Tokyo (JP); Teruya Fujii, Tokyo (JP)

(73) Assignee: SOFTBANK CORP., Tokyo (JP)

( * ) Notice: Subject to any disclaimer, the term of this patent is extended or adjusted under 35 U.S.C. 154(b) by 70 days.

(21) Appl. No.: 14/427,443

(22) PCT Filed: Apr. 2, 2014

(86) PCT No.: PCT/JP2014/059755
§ 371 (c)(1),
(2) Date: Mar. 11, 2015

(87) PCT Pub. No.: WO2015/151249
PCT Pub. Date: Oct. 8, 2015

(65) Prior Publication Data
US 2016/0261737 A1 Sep. 8, 2016

(51) Int. Cl.
*H04M 3/22* (2006.01)
*H04M 1/24* (2006.01)
*H04M 3/26* (2006.01)

(52) U.S. Cl.
CPC ........... *H04M 3/2236* (2013.01); *H04M 1/24* (2013.01); *H04M 3/26* (2013.01)

(58) Field of Classification Search
None
See application file for complete search history.

(56) References Cited

U.S. PATENT DOCUMENTS 6,697,342 B1 * 2/2004 Smyth .................. H04L 12/1813
348/14.08
7,194,068 B2 * 3/2007 Page ........................ G10L 25/69
370/503

(Continued)

FOREIGN PATENT DOCUMENTS

| JP | 62-128636 | 6/1987 |
| JP | 4-70026 | 3/1992 |
| JP | 2008-532416 A | 8/2008 |

OTHER PUBLICATIONS

International Telecommunication Union, ITU-T, Series P: Telephone Transmission Quality, Telephone Installations, Local Line Networks, "Methods for objective and subjective assessment of quality," p. 862, Feb. 2001.

(Continued)

*Primary Examiner* — Xavier Szewai Wong
(74) *Attorney, Agent, or Firm* — Muirhead and Saturnelli, LLC

(57) ABSTRACT

Communication systems and communication methods are provided, by which load of a communication network when measuring a voice communication quality can be suppressed. A test signal for voice communication quality evaluation is transmitted to a communication terminal apparatus via a communication network, and a received voice data encoded by a predetermined scheme for the test signal received with the communication terminal apparatus is received from the communication terminal apparatus. A received voice signal is generated from the received voice data received from the communication terminal apparatus, and a evaluation value of voice communication quality is calculated by comparing the generated received voice signal with the test signal before transmitting.

14 Claims, 4 Drawing Sheets

(56) References Cited

U.S. PATENT DOCUMENTS

| | | | | |
|---|---|---|---|---|
| 2004/0042445 A1* | 3/2004 | Kashiwagi | ............ | H04M 3/2236 370/352 |
| 2005/0261895 A1* | 11/2005 | Bauer | ..................... | G10L 25/69 704/216 |
| 2006/0198392 A1* | 9/2006 | Park | ................... | H04N 21/2343 370/468 |
| 2006/0199548 A1 | 9/2006 | Saraby | | |

OTHER PUBLICATIONS

International Telecommunication Union, ITU-T, Series P: Terminals and Subjective and Objective Assessment Methods, "Methods for objective and subjective assessment of speech quality," p. 863, Feb. 2011.

Hirokazu, Suzuki, et al., "Development of End-to-End QoS Management System for VoIP Networks," IEICE Technical Report; CQ2005-10, Apr. 15, 2005, vol. 105, No. 17, pp. 11-14.

* cited by examiner

COMMUNICATION SYSTEM AND COMMUNICATION METHOD

TECHNICAL FIELD

The present invention relates to communication methods and communication systems, which are capable of evaluating a quality of voice communication via a communication network.

BACKGROUND ART

A quality of voice communication transceived via a communication network is affected by various factors such as environmental noise and an utterance level during utterance, performance of voice input and voice process at a voice transmitting side, a transmission quality, performance of voice output and voice process at a voice receiving side, environmental noise and a voice receiving level during reception, etc. Conventionally, a voice-communication quality measurement system of measuring the above-mentioned quality of voice communication is known, which is provided with a mobile telephone that is functioned as a communication terminal apparatus dedicated for measurements and in which a sound source file and an application for measurements of voice communication quality are implemented in advance, and a server for measurements of voice communication quality that is connected to a fixed-telephone communication network and in which a sound source file for measurements of voice communication quality are implemented in advance. In this voice-communication quality measurement system, a specialized staff responsible for measurements of voice communication quality operates the foregoing mobile telephone dedicated for measurements so as to perform an outgoing call to the server and notifies of a request to measure a voice communication quality. When receiving the request from the mobile telephone, the sever generates a voice signal based on the sound source file and transmits the generated voice signal to a communication terminal apparatus via the fixed-telephone communication network and a mobile telephone network. In the communication terminal apparatus, the voice signal received from the server is recorded and stored as a recorded audio file and a voice communication quality is measured by compared a voice signal of the recorded audio file with a voice signal of the sound source file. A measurement result of the voice communication quality is outputted, for example, as a MOS (Mean Opinion Scores) value standardized in Non-Patent Literature 1, Non-Patent Literature 2 and the like. The MOS value is a computed value corresponding to an average value of scores on five-grade evaluation (referred to Table 1) by a large number of persons based on comparison results between a voice to be evaluated and a voice of a reference sound source. In Non-Patent Literature 1 and Non-Patent Literature 2, an international standard method of mechanically realizing the foregoing computation of MOS values is described.

TABLE 1

| Score | Quality |
|---|---|
| 5 | Excellent |
| 4 | Good |
| 3 | Fair |
| 2 | Poor |
| 1 | Bad |

CITATION LIST

Non-Patent Literature

Non-Patent Literature 1: "Perceptual evaluation of speech quality (PESQ): An objective method for end-to-end speech quality assessment of narrow-band telephone networks and speech codecs", SERIES P: TELEPHONE TRANSMISSION QUALITY, TELEPHONE INSTALLATIONS, LOCAL LINE NETWORKS, Methods for objective and subjective assessment of quality, TELECOMMUNICATION STANDARDIZATION SECTOR OF ITU, ITU-T Recommendation P.862 (February 2001).

Non-Patent Literature 2: "Perceptual objective listening quality assessment", SERIES P: TERMINALS AND SUBJECTIVE AND OBJECTIVE ASSESSMENT METHODS, Methods for objective and subjective assessment of speech quality, TELECOMMUNICATION STANDARDIZATION SECTOR OF ITU, ITU-T Recommendation P.863 (January 2011).

SUMMARY OF INVENTION

Technical Problem

In foregoing conventional voice communication measurement system, the recorded audio file of WAV (RIFF waveform Audio Format) format, compressed format (for example, zip, bz2, gz format) or the like, which is generated by recording the voice signal received with the communication terminal apparatus, is transmitted to the server for measurements of voice communication quality via the communication network. Since the recorded audio file transmitted via the communication network in this way has a great amount of data, load of the communication network may increase.

The present invention has been made in view of the above-described problem and an objective is to provide communication systems and communication methods, which are capable of suppressing load of a communication network when measuring a voice communication quality.

Solution to Problem

A communication system according to an aspect of the present invention is a communication system that comprises a communication terminal apparatus and a voice communication quality evaluation system that is capable of communicating with the communication terminal apparatus via a communication network. The voice communication quality evaluation system comprises sound source file memory means of memorizing a sound source file of a test signal for voice communication quality evaluation, test signal transmitting means of transmitting the test signal to the communication terminal apparatus via the communication network, data receiving means of receiving from the communication terminal apparatus a received voice data encoded by a predetermined scheme for the test signal received with the communication terminal apparatus, signal generating means of generating a received voice signal from the received voice data received from the communication terminal apparatus, and calculating means of calculating a evaluation value of voice communication quality by comparing the received voice signal with the test signal before transmitting. The communication terminal apparatus comprises test signal receiving means of receiving the test signal from the voice communication quality evaluation system via the communication network, and received voice data transmitting means of transmitting to the voice communication quality evaluation system the received voice data encoded by the predetermined scheme for the test signal received from the voice communication quality evaluation system.

According to this present communication system, since the data transmitted to the voice communication quality evaluation system from the communication terminal apparatus that receives the test signal is the received voice data encoded by the predetermined scheme for the test signal, data amount transmitted via the communication network can be reduced compared to the case of transmitting a recorded audio file created by recording a received signal of the test signal. Accordingly, it is capable of suppressing load of the communication network when measuring the voice communication quality.

In the foregoing communication system, the communication terminal apparatus may further comprise means of downloading contents from a contents providing server under a condition without a communication interruption for the test signal in the communication terminal apparatus.

According to this present communication system, since contents can be downloaded from the contents providing server under the condition without a communication interruption for the test signal in the communication terminal apparatus, it can be enhanced for a user of the communication terminal apparatus to enhance an incentive to cooperate positively on the voice communication quality evaluation.

In the foregoing communication system, the foregoing communication terminal apparatus may further comprise outgoing call means of performing an outgoing call of voice communication to the voice communication quality evaluation system via the communication network and the foregoing voice communication quality evaluation system may transmit the test signal to the communication terminal apparatus via the communication network in response to the outgoing call from the communication terminal apparatus.

According to this present communication system, by performing the outgoing call of voice communication from the communication terminal apparatus to the voice communication quality evaluation system, an evaluation process of voice communication quality that includes calculating the evaluation value of voice communication quality is started. Accordingly, the voice communication quality can be evaluated without requesting any special operation for evaluation of voice communication quality to a user of the communication terminal apparatus and without being conscious by a user of the voice communication.

In the foregoing communication system, the foregoing voice communication quality evaluation system may further comprise schedule information transmitting means of transmitting to the communication terminal apparatus a schedule information for the outgoing call in the communication terminal apparatus, and the communication terminal apparatus may further include schedule information receiving means of receiving the schedule information from the voice communication quality evaluation system and may perform the outgoing call to the voice communication quality evaluation system based on the schedule information received from the voice communication quality evaluation system.

According to this present communication system, the outgoing call to the voice communication quality evaluation system is performed based on the schedule information transmitted from the voice communication quality evaluation system to the communication terminal apparatus and an evaluation process of voice communication quality that includes calculating the evaluation value of voice communication quality is started. Accordingly, a timing of starting the evaluation process of voice communication quality can be controlled by the voice communication quality evaluation system.

In the foregoing communication system, the foregoing voice communication quality evaluation system may transmit the test signal by performing an outgoing call to the communication terminal apparatus based on schedule information set in advance.

In the foregoing communication system, the foregoing voice communication quality evaluation system may further comprise means of changing the schedule information based on at least one of a terminal identification information of the communication terminal apparatus, a communication history of the communication terminal apparatus, a model of the communication terminal apparatus, a current location of the communication terminal apparatus, a time zone, a moving speed of the communication terminal apparatus, information on a communications service provider of the communication network, information on a communications service provider contracted for the communication terminal apparatus and network information in the communication terminal apparatus.

According to this present communication system, a timing of starting the evaluation process of voice communication quality can be controlled appropriately in accordance with various information.

In the foregoing communication system, the foregoing communication terminal apparatus may further comprise additional information transmitting means of transmitting to the voice communication quality evaluation system an additional information relating to at least one of the communication terminal apparatus, the communication network and the voice communication quality evaluation, and the foregoing voice communication quality evaluation system may receive the at least one additional information from the communication terminal apparatus and may memorize the result of voice communication quality evaluation including the evaluation value of voice communication quality and the additional information relating to the at least one by being associated with each other.

According to this present communication system, a statistical processing and/or an analysis of the result of voice communication quality evaluation can be performed based on the various additional information.

In the foregoing communication system, the foregoing test signal transceived between the communication terminal apparatus and the voice communication quality evaluation system may be selected from two or more types of test signals set in advance.

According to this present communication system, since an appropriate test signal can be selected from the two or more types of test signals set in advance in accordance with various situations, the voice communication quality can be evaluated by simulating an actual usage pattern of voice communication used by a user.

In the foregoing communication system, the foregoing test signal transceived between the communication terminal apparatus and the voice communication quality evaluation system may be selected from the two or more types of test signals, based on at least one of a terminal identification information of the communication terminal apparatus, a communication history of the communication terminal apparatus, a model of the communication terminal apparatus, a current location of the communication terminal apparatus, a time zone, a moving speed of the communication terminal apparatus, information on a communications service provider of the communication network, information on a communications service provider contracted for the communication terminal apparatus and network information in the communication apparatus.

According to this present communication system, by selecting an appropriate test signal from the two or more types of test signals based on various information such as the communication history reflecting an actual usage pattern of voice communication used by a user, it is capable of improving accuracy when simulating the actual usage pattern of voice communication used by a user. Accordingly, it is capable of obtaining an evaluation result of voice communication quality that is more similar to an actual quality felt by general users.

In the foregoing communication system, a presence or absence of a dropped-call of the voice communication may be determined based on a presence or absence of a reception interruption for the test signal.

According to this present communication system, it is capable of evaluating the dropped-call of voice communication in addition to the voice communication quality with respect to a voice communication in downlink of the communication network.

In the foregoing communication system, the test signal may have an end discriminating signal at a tail end thereof and a presence or absence of a dropped-call of voice communication may be determined based on a presence or absence of the end discriminating signal in the test signal.

According to this present communication system, since a dropped-call of voice communication can be determined based on a presence or absence of the end discriminating signal in the test signal, it is capable of determining the dropped-call of voice communication even when a length of test signal is not known in advance. Furthermore, the length of the test signal can be arbitrarily set and a voice call communication can be evaluated under the same condition as an actual voice call.

In the foregoing communication system, the foregoing test signal may be a signal with a voiced period including a voice signal used for evaluating a voice communication quality and a silent period.

According to this present communication system, since a test signal having a length similar to a length in the case of an actual voice communication can be set by adjusting a length of the silent period, it is capable of evaluating a voice communication under a condition nearer to the condition in the case of an actual voice communication.

In the foregoing communication system, the foregoing communication terminal apparatus may further comprise display means of displaying by switching a display content in accordance with the silent period and the voiced period in the test signal when receiving the test signal.

According to this present communication system, an appropriate information corresponding to each of the silent period and the voiced period in the test signal can be notified to a user of the communication terminal apparatus by displaying the information.

A communication method according to another aspect of the present invention is a communication method capable of evaluating a quality of voice communication includes transmitting a test signal for voice communication quality evaluation to a communication terminal apparatus via a communication network, receiving from the communication terminal apparatus a received voice data encoded by a predetermined scheme for the test signal received with the communication terminal apparatus, generating a received voice signal from the received voice data received from the communication terminal apparatus, and calculating a evaluation value of voice communication quality by comparing the received voice signal with the test signal before transmitting.

According to this present communication method, since the data transmitted to the voice communication quality evaluation system from the communication terminal apparatus that receives the test signal is the received voice data encoded by the predetermined scheme for the test signal, data amount transmitted via the communication network can be reduced compared to a case of transmitting a recorded audio file created by recording the received signal of the test signal. Accordingly, it is capable of suppressing load of the communication network when measuring the voice communication quality.

Advantageous Effects of Invention

According to the present invention, it is capable of suppressing a load of a communication network when measuring a voice communication quality.

DESCRIPTION OF EMBODIMENTS

Hereinafter, embodiments of the present invention will be described with reference to the drawings.

Figure 1:
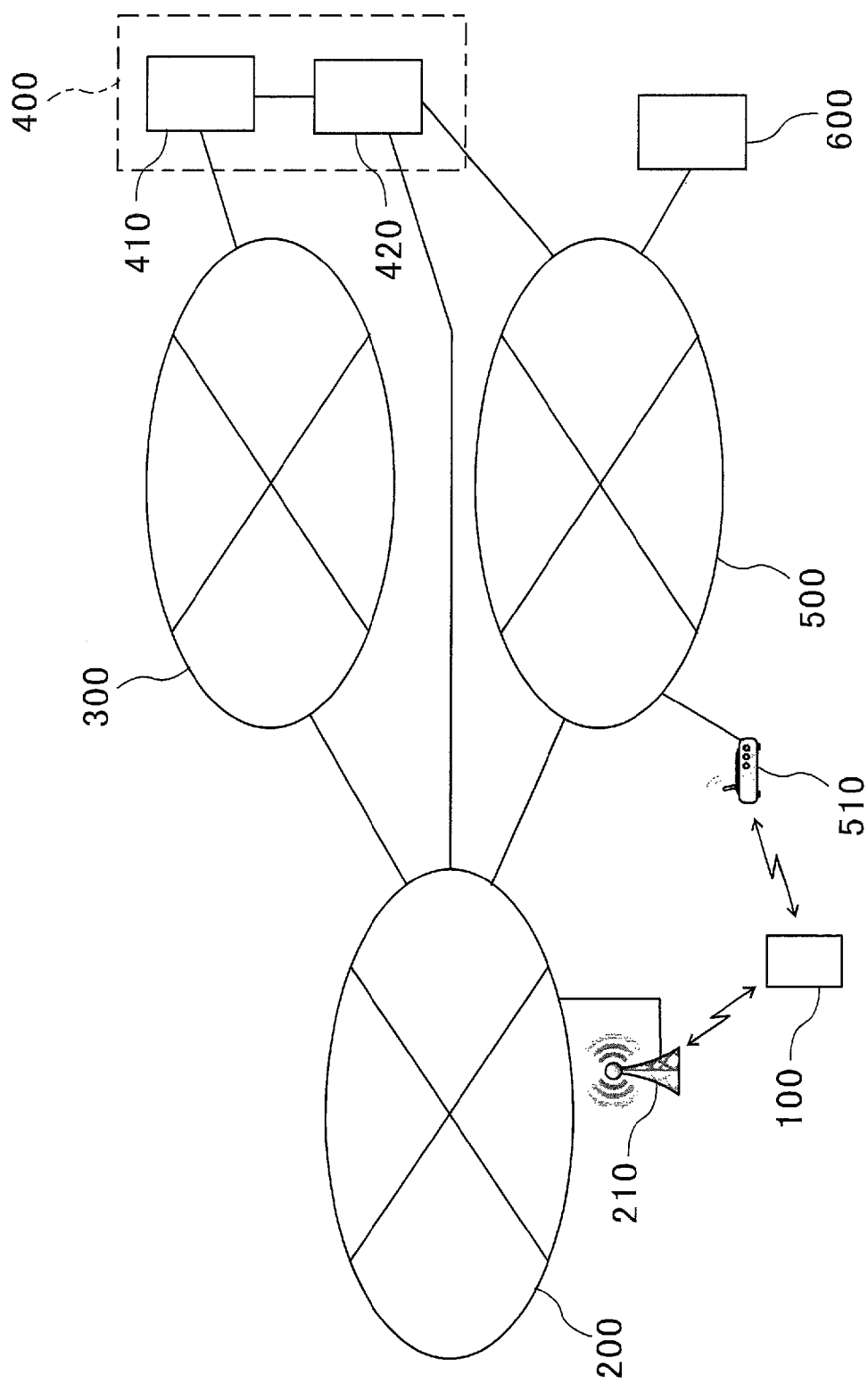
FIG. 1 is a schematic diagram showing one example of main configuration of an overall communication system according to an embodiment of the present invention.

FIG. 1 is a schematic diagram showing one example of main configuration of an overall communication system according to an embodiment of the present invention. The communication system of this present embodiment includes a communication terminal apparatus 100 capable of being used by a user, and a communication quality evaluation system 400 of performing a process relating to communication quality evaluation for a voice communication by using the communication terminal apparatus 100 via a mobile communication network (mobile telephone network) 200. The communication quality evaluation system 400 may be configured with a single server or network apparatus, or may be configured by combining with a plurality of servers or network apparatuses. The communication quality evaluation system 400 exemplified in FIG. 1 is provided with an automatic voice response apparatus 410 of the present embodiment and a delivery and analysis server 420. The communication terminal apparatus 100 is capable of performing a voice communication with the automatic voice response apparatus 410 of communication quality evaluation system 400 via the mobile communication network 200 including a base station 210 and via a fixed-telephone network 300. The mobile communication network 200 includes a circuit switched network and a packet switched network and the communication terminal apparatus 100 is capable of performing a voice communication via the circuit switched network and/or a voice communication by a VoIP (Voice over Internet Protocol) or the like via the packet switched network. Furthermore, the communication terminal apparatus 100 is capable of accessing the Internet 500 via the foregoing mobile communication network 200 including the base station 210 or via a access-point apparatus 510 of wireless LAN such as WiFi (Wireless Fidelity) and so on, transceiving various data to and from a delivery and analysis server 420 of the communication quality evaluation system 400 and/or downloading contents such as music and so on from a contents providing server 600.

The communication terminal apparatus 100 is, for example, a tablet PC or a mobile communication terminal capable of performing voice communication such as a mobile telephone, a smartphone, a PHS or the like, and capable of performing a voice communication and/or a data communication with a communication destination via the mobile communication network 200 including a base station being as a wireless relaying apparatus that is not shown, switching equipment or the like. For example, when existing in a cell being as a wireless communication area of the mobile communication network 200, the communication terminal apparatus 100 is capable of performing a voice communication with a communication terminal apparatus such as a tablet PC, a mobile communication terminal such as a mobile telephone, a smartphone, a PHS, etc. or the like which exists in a cell of other mobile communication network and is connected thereto. Further, when exiting in a cell of the mobile communication network 200, the communication terminal apparatus 100 is capable of performing a voice communication with the automatic voice response apparatus 410 as being as a voice communication destination of the communication quality evaluation system 400 via a fixed-telephone network 300 and/or performing a data communication and voice communication with the delivery and analysis server 420 of the communication quality evaluation system 400 via the mobile communication network 200 and/or the Internet 500. The foregoing cell is, for example, any one of various cells that are different in size between themselves, such as macro cell, a micro cell, a femto cell, a pico cell or the like.

The automatic voice response apparatus 410 is configured to be capable of communicating with each of the delivery and analysis server 420 and the communication terminal apparatus 100. The automatic voice response apparatus 410 is an apparatus that performs an automatic voice response in response to an outgoing call from the communication terminal apparatus 100 and so on. For example, the automatic voice response apparatus 410 transmits a test signal for voice communication quality evaluation described below to the communication terminal apparatus 100 in response to an outgoing call from the communication terminal apparatus 100.

Moreover, the communication terminal apparatus 100 and automatic voice response apparatus 410 are in a state of mutual time synchronization. For example, each of the communication terminal apparatus 100 and automatic voice response apparatus 410 is capable of performing a time synchronization processing by communicating an NTP (Network Time Protocol) server that is not shown and connected to the mobile communication network 200 or the Internet 500. The time synchronization processing in each of the apparatuses may be performed by receiving GPS signals or other methods.

The delivery and analysis server 420 is configured to communicate with each of the automatic voice response apparatus 410 and communication terminal apparatus 100. The delivery and analysis server 420 is a server that performs various processes relating to the voice communication quality evaluation. For example, the delivery and analysis server 420 calculates a MOS value (refer to Non-Patent Literatures 1 and 2) as being an evaluation value of voice communication quality, and/or determines a dropped-call of voice communication via the mobile communication network 200. Moreover, the delivery and analysis server 420 is capable of storing and managing sound source files of test signals for voice communication quality evaluation, information on evaluation values of voice communication quality and results of determining the dropped-call of networks, and the like, and/or performing various statistical processes and analyzing processes with respect to the information.

The communication terminal apparatus 100 is configured with, for example, a wireless signal processing section including an antenna, a transmitting amplifier, a receiving amplifier, communication chip sets, etc., a baseband signal processing section, an application execution management section, a voice input device including a small-size microphone, a voice output device including a speaker, a receiver, a vibration generator or the like, a display section such as a LCD as being display means, a main controller and so on. Furthermore, the communication terminal apparatus 100 includes a GPS receiving section that acquires information on its own current location by using the GPS (Global Positioning System), as being current location acquiring means. The communication terminal apparatus 100 may include an imaging section configured with a camera device such as a CCD, a CMOS device or the like, and an attitude detecting section configured with a gyro sensor, an acceleration sensor, a magnetic sensor or the like.

The main controller is configured with, for example, a microprocessor such as an MPU (Micro Processing Unit) and memories such as a RAM, a ROM etc., and controls respective sections based on a predetermined control program implemented in advance. For example, by executing the control program, the main controller is capable of performing a processing of a voice communication with the automatic voice response apparatus 410 via the mobile communication network 200 and the fixed-telephone network 300 and a control of the same process, performing a process of extracting a received voice data of test voice signal based on the received signal from the automatic voice response apparatus 410 as a received voice data (digital signal) encoded by a predetermined compressing-encoding scheme, performing a process of transmitting and receiving of the received voice data of test signal to and from the delivery and analysis server 420 via the mobile communication network 200 and the Internet 500 and a control of the same process, performing a download of contents such as music from the contents providing server 600 and a control of the same process, performing a process of determining presence or absence of a dropped-call, and so on.

The foregoing compressing-encoding scheme for the received voice data includes, for example, GSM (Global System for Mobile communications) AMR (Adaptive Multi-Rate) Codec/ACELP (Algebraic Code Excited Linear Prediction) compression (bit rate: 4.75 [kbps]-12.2 [kbps]). A file of the received voice data (digital) compressed and encoded in this way is capable of having a data amount of about one-tenth of a recorded audio file (e. g. WAV format file) obtained from the received voice data.

Moreover, the communication terminal apparatus 100 is capable of executing various application programs on a native environment of the main controller and/or executing various application programs on a virtual environment established by the application executing management section. In the description herein, the "application" (hereinafter abbreviated as "app" as appropriate) means a software capable of being applied to each of various uses such as a telephone, recording, browser, camera, retrieval, mail, information delivery, calendar, clock, music playback, map display, data folder, message communication, video playback and so on as well as a communication quality evaluation processing, and is also called "application software". The "application" is an aggregation of files of executive programs developed with various computer languages and files of setting information, image, etc. that are used and/or referred when executing the program or in other timing.

The application execution management section manages, for example, program modules and libraries that are used for executing the applications. Moreover, the application execution management section establishes a framework (for example, an Android framework, an iOS framework, etc.) or a virtual execution environment such as a Dalvik (registered trademark) VM, a Java VM, etc., which are used for any one, two or more than two of plural kinds of applications such as an Android (registered trademark) application, an iOS (registered trademark) application, a Windows (registered trademark) application, a Java (registered trademark) application and so on. The application execution management section is configured to have a multitasking function so as to execute a plurality of applications in parallel.

Each of the automatic voice response apparatus 410 and delivery and analysis server 420 is configured, for example, by using hardwares such as a computer apparatus having an MPU, memories, etc., a decoder being as a decoding means, an external communication interface apparatus, etc. and is capable of performing various processes for voice communication quality evaluation by executing a predetermined program. When receiving from the communication terminal apparatus 100 a file of received voice data (digital signal) encoded by a predetermined encoding scheme, the foregoing decoder can decode the received voice data using a predetermined decoding algorithm and generate a received voice signal (analog signal) that is a test voice signal received from the communication terminal apparatus 100.

In one example of voice communication quality evaluation of the present embodiment, the main controller, antenna, transmitting amplifier, receiving amplifier, wireless signal processing section, baseband signal processing section, and so on of the communication terminal apparatus 100 may also function as being each of means such as outgoing call means of performing an outgoing call of voice communication to the automatic voice response apparatus 410 of the voice communication quality evaluation system 400 via the networks 200 and 300 based on predetermined schedule information set in advance, test signal receiving means of receiving a test signal from the automatic voice response apparatus 410 via the networks 200 and 300, received voice data transmitting means of transmitting to the delivery and analysis server 420 of the voice communication quality evaluation system 400 the file of received voice data encoded by a predetermined scheme for the test signal received from the automatic voice response apparatus 410, and the like.

Furthermore, the main controller, antenna, transmitting amplifier, receiving amplifier, wireless signal processing section, baseband signal processing section, and so on of the communication terminal apparatus 100 may also function as being each of means such as download means of downloading contents such as music, etc. from the contents providing server 600 after receiving the test signal, means of transmitting to the delivery and analysis server 420 of the voice communication quality evaluation system 400 the received voice data encoded by a predetermined scheme for the test signal after the download of contents is completed, and the like.

Moreover, the computer apparatus and external communication interface apparatus of the automatic voice response apparatus 410 may also function as being each of means such as sound source file memory means of memorizing a sound source file of a test signal for voice communication quality evaluation, test signal transmitting means of transmitting a test signal to the communication terminal apparatus 100 via the networks 200 and 300 in response to an outgoing call from the communication terminal apparatus 100, and the like.

Further, the computer apparatus, decoder and external communication interface apparatus of the delivery and analysis server 420 may also function as being each of means such as data receiving means of receiving from the communication terminal apparatus 100 a received voice data (digital signal) encoded in predetermined scheme for the test signal, signal generating means of generating a received voice signal (analog signal) from the received voice data received from the communication terminal apparatus 100, calculating means of calculating an evaluation value of voice communication quality by comparing the test signal before transmitting with the received voice signal, determining means of determining a presence or absence of a dropped-call of the voice communication based on a presence or absence of a disconnection of communication during a silent period of the test signal, evaluation result memory means of memorizing an evaluation result of voice communication quality including the evaluation value of voice communication quality and a result of determining a dropped-call, and the like.

It is noted that, in other examples of the voice communication quality evaluation according to the present embodiment, an outgoing call may be performed from the voice communication quality evaluation system 400 to the communication terminal apparatus 100. In these examples, the computer apparatus and external communication interface apparatus of the automatic voice response apparatus 410 may also function as being outgoing means of performing a outgoing call of voice communication to the communication terminal apparatus 100 via the networks 200 and 300 based on predetermined schedule information set in advance. Furthermore, the main controller, antenna, transmitting amplifier, receiving amplifier, wireless signal processing section, baseband signal processing section, and so on of the communication terminal apparatus 100 may also function as being incoming call means of receiving an outgoing call from the communication terminal apparatus 100.

An application of voice communication quality evaluation (hereinafter called as "voice communication quality evaluation app") implemented in the communication terminal apparatus 100 has a plurality of operation modes. For example, the voice communication quality evaluation app has a manual measurement mode for starting an evaluation process of voice communication quality by manually activating the app with a user and an automatic measurement mode for starting an evaluation process of voice communication quality based on schedule information delivered in advance, under a constantly activating state in which the voice communication quality evaluation app is running in the background. The manual measurement mode and automatic measurement mode can be selected based on, for example, a selecting operation by a user or an instruction from the voice communication quality evaluation system 400. Furthermore, the voice communication quality evaluation app has a terminal calculation/determination mode of calculating an evaluation value of voice communication quality and determining a dropped-call of the voice communication in the communication terminal apparatus 100, and a server calculation/determination mode of calculating an evaluation value of voice communication quality and determining a dropped-call of the voice communication in the delivery and analysis server 420 of the voice communication quality evaluation system 400. With respect to the terminal calculation/determination mode and the server calculation/determination mode, the mode can be also selected based on, for example, a selecting operation by a user or an instruction from the voice communication quality evaluation system 400.

Figure 2A:
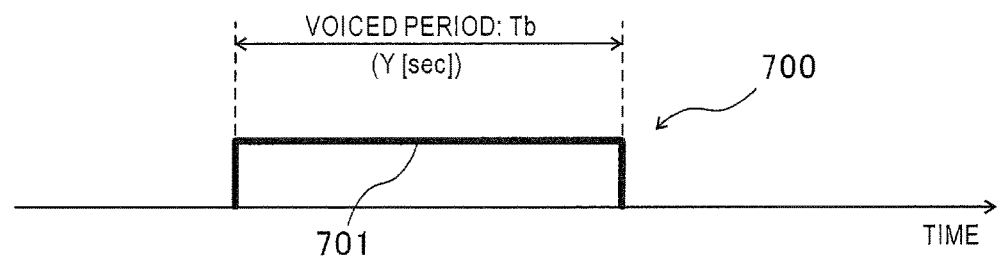
FIG. 2A and FIG. 2B are schematic diagrams showing one example of a test signal for voice communication quality evaluation, respectively.
Figure 2B:
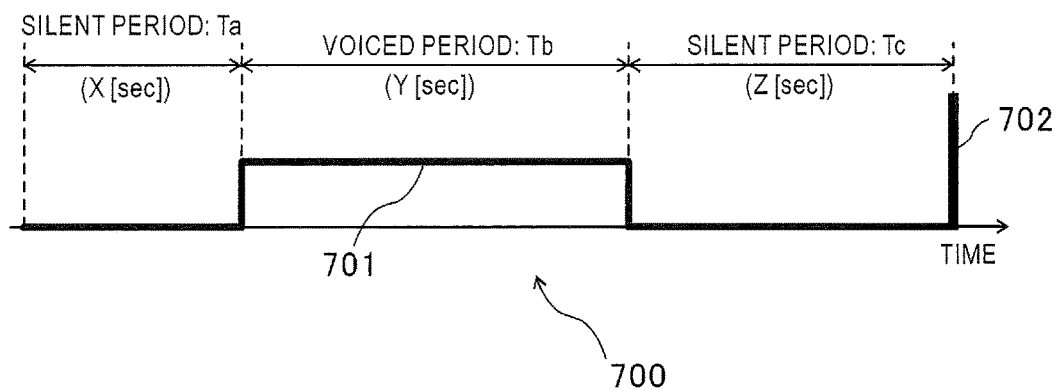

FIG. 2A and FIG. 2B are schematic diagrams showing one example of the foregoing test signal for voice communication quality evaluation, respectively.

In an example of a test signal 700 in FIG. 2A, a voiced period Tb with a test signal 701 used for evaluation of voice communication quality is disposed in the whole of test signal 700.

On the other hand, in another example of the test signal 700 in FIG. 2B, the test signal 700 has a first silent period Ta, a voiced period Tb with a test signal 701 used for evaluation of voice communication quality and a second silent period Tc used for evaluation of a dropped-call of the voice communication, and each of the periods is continuously disposed in that order. The tail end portion of second silent period Tc has an end-identification signal 702 with a specific sound for identifying the end of the silent period Tc. Each of the first silent period Ta, the voiced period Tb and the second silent period Tc is set so as to have a predetermined length (X [sec], Y [sec], Z [sec]).

The length (Y [sec]) of the voiced period Tb in the test signal 700 of FIG. 2A and FIG. 2B is set to a length (for example, length of 8 [sec]) regulated for calculating a MOS value in the ITU-T (International Telecommunication Union Telecommunication Standardization Sector) standard.

The lengths (X [sec] and Z [sec]) of the first silent period Ta and the second silent period Tc in the test signal 700 of FIG. 2B may be set by the automatic voice response apparatus 410 based on various information. For example, each of the lengths (X [sec] and Z [sec]) may be set to an optimum length based on at least one of a communication history of the communication terminal apparatus 100, a model of the communication terminal apparatus 100, a current location (GPS position, area, existing cell ID, etc.) of the communication terminal apparatus 100, a time zone (weekday/holiday, day of week, early morning/daytime/nighttime), a moving speed (for example, resting, low speed during moving on foot or the like, high speed during moving by car, train or the like) of the communication terminal apparatus 100, information on a communications service provider of the mobile communication network 200, information on a communications service provider contracted for the communication terminal apparatus 100, and network information in the communication terminal apparatus 100 such as wireless channel quality information (for example, receiving SINR, RSSI, RSRP, CQI) exemplified in Table 2.

TABLE 2

| Category | Item |
|---|---|
| Fundamental information | Physical cell ID (PCI) |
| | Cell ID (CI) |
| | Tracking Area Code (TAC) |
| | Connection network type |
| | Center frequency |
| | Frequency bandwidth |
| Wireless channel quality information | Received signal strength indicator (RSSI) |
| | Reference signal received power (RSRP) |
| | Received signal code power (RSCP) |
| | Reference signal received quality (RSRQ) |
| | Energy per chip to noise ratio (Ec/No) |
| | Block error rate (BLER) |
| | Channel quality information (CQI) |

Furthermore, it may be configured so as to have an automatic learning function of successively learning and updating the optimum value of each length (X [sec], Z [sec]) of the foregoing silent period Ta and silent period Tc, and the last optimum value may be preferentially set as each length (X [sec], Z [sec]) of the foregoing silent period Ta and silent period Tc in a next test signal. Moreover, the total value of lengths (X [sec], Y [sec], Z [sec]) of the first silent period Ta, the voiced period Tb and the second silent period Tc may be set so as to be equal to or less than a predetermined length (for example, 100 [sec]).

In case of using the test signal 700 in FIG. 2A, the automatic voice response apparatus 410 may advancely memorize a plurality of types of sound source files including mutually different pattern of test signals that are different in length of the foregoing voiced period Tb between themselves, select a test signal to be transmitted from the plurality of types of test signals, and transmit the selected test signal to the communication terminal apparatus 100.

On the other hand, In case of using the test signal 700 in FIG. 2B, the automatic voice response apparatus 410 may advancely memorize a plurality of types of sound source files including mutually different pattern of test signals that are different in length of at least one of the first silent period Ta, the voiced period Tb and the second silent period Tc between themselves, select a test signal to be transmitted from the plurality of types of test signals, and transmit the selected test signal to the communication terminal apparatus 100.

The selection of test signal may be performed based on various information. For example, an optimum test signal may be selected based on at least one of a communication history of the communication terminal apparatus 100, a model of the communication terminal apparatus 100, a current location (GPS position, area, existing cell ID, etc.) of the communication terminal apparatus 100, a time zone (weekday/holiday, day of week, early morning/daytime/nighttime), a moving speed (for example, low speed during moving on foot and or the like, high speed during moving by car, train or the like) of the communication terminal apparatus 100, information on a communications service provider of the mobile communication network 200, information on a communications service provider contracted for the communication terminal apparatus 100 and wireless channel quality information in the communication terminal apparatus 100 (for example, receiving SINR, RSSI, RSRP, CQI) exemplified in the foregoing Table 2. Furthermore, it may be configured so as to have an automatic learning function of successively learning and updating the test signals to be transmitted, which are selected in this way, and the last selected test signal may be preferentially selected as a next test signal. For example, in a case that moving speed of the communication terminal apparatus 100 is low speed which is lower than a predetermined threshold value such as a case of staying at home, moving on foot, or the like, a test signal with the second silent period Tc set to shorter time may be selected, and in another case that moving speed of the communication terminal apparatus 100 is high speed which is equal to or higher than a predetermined threshold value such as a case of moving by car a test signal with the second silent period Tc set to longer time may be selected.

Figure 3:
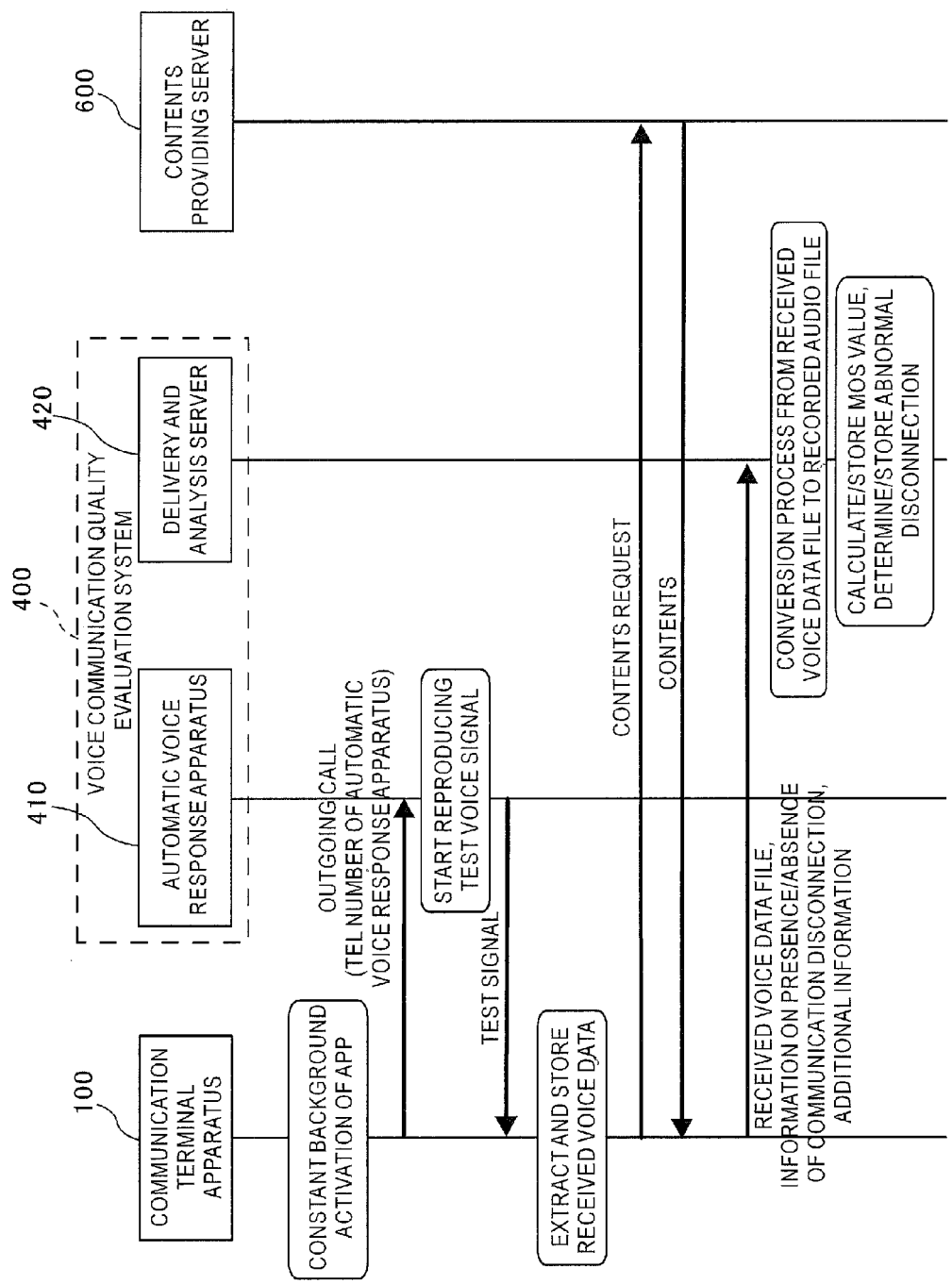
FIG. 3 is a sequence diagram showing one example of communication quality evaluation for voice communication in a downlink direction, which is performed upon an outgoing call from a communication terminal apparatus in the communication system according to the present embodiment.

FIG. 3 is a sequence diagram showing one example of communication quality evaluations for a voice communication in a downlink direction, which is performed upon an outgoing call from a communication terminal apparatus in the communication system according to the present embodiment.

It is noted that, this present example shows an example in which a test signal 700 of FIG. 2B is used and the voice communication quality evaluation system 400 calculates a MOS value indicating a voice communication quality and determines a dropped-call of the voice communication. In the delivery and analysis server 420, a sound source file of a test signal for voice communication quality evaluation is stored. In the communication terminal apparatus 100, a voice communication quality evaluation app for performing an evaluation process of voice communication quality is installed in advance. This voice communication quality evaluation app is activated in advance and is running constantly in the background, In FIG. 3, when a predetermined voice communication quality evaluation timing has come, the communication terminal apparatus 100 automatically activates the voice communication quality evaluation app and performs an automatic transmission for outgoing call to a telephone number (for example, a fixed telephone number, 03********) of the automatic voice response apparatus 410. The telephone number of the automatic voice response apparatus 410 is set in the voice communication quality evaluation app in advance.

When receiving the outgoing call from the communication terminal apparatus 100, the automatic voice response apparatus 410 starts reproducing a test signal for voice communication quality evaluation based on the sound source file for voice communication quality evaluation. The reproduced test signal is transmitted to the communication terminal apparatus 100 via the fixed-telephone network 300 and the mobile communication network 200.

The communication terminal apparatus 100 extracts a received voice data encoded by a predetermined scheme for the test signal from the received signal received from the automatic voice response apparatus 410, and stores the extracted received voice data as a file with a predetermined format (for example, a file with an extension of "dat"). Subject to absence of communication disconnection in this test signal, the communication terminal apparatus 100, based on information on connection destination (for example, IP address or URL, ID, password, identification information or file name of contents) set in advance, accesses the contents providing server 600 by connecting the Internet 500, logons the server, and transmits a contents request for requesting a contents such as music, etc. which is a privilege for performing a voice communication quality evaluation. The contents providing server 600 responds to the contents request from the communication terminal apparatus 100 and transmits a file of the contents such as music, etc. designated by the contents request. The communication terminal apparatus 100 stores the file of contents such as music, etc. downloaded from the contents providing server 600 in a designated folder. When the download of the contents file is failed, the communication terminal apparatus 100 performs the download of contents again by the voice communication quality evaluation app.

When the download of the contents file is succeeded (completed), the communication terminal apparatus 100 transmits a file of the foregoing received voice data, information on presence or absence of communication disconnection during receiving the test signal and other additional information to the delivery and analysis server 420.

Table 3 is a list showing one example of information capable of being transmitted (uploaded) from the foregoing communication terminal apparatus 100 to the delivery and analysis server 420.

TABLE 3

| | Voice communication evaluation result | Evaluation value of voice quality (MOS value), Determination result of dropped-call, Recorded audio file |
|---|---|---|
| Additional information | Measurement-related information | Measurement time (date and time information), Measurement location |
| | Terminal information | Terminal identification number (IMSI), Telephone number, Model name, Carrier information, Moving speed |
| | Network information | Connected network type, Base-station information, Radio quality information, Roaming information |

As shown in the example of Table 3, measurement-related information, terminal information, network information and the like are exemplified as additional information transmitted to the delivery and analysis server 420 together with the foregoing result of voice communication quality evaluation.

The measurement-related information is location information (GPS position, area, existing cell ID, etc.) of a communication terminal apparatus 100 that performs measurements of an evaluation value (MOS value) of voice communication quality and dropped-calls, date and time information of the measurement, or the like.

The terminal information is a terminal identification number (for example, IMSI: International Mobile Subscriber Identity), telephone number, model name, information on a subscribed communications service provider (carrier information), moving speed (resting, low speed during moving on foot or the like, high speed during moving by car, train or the like) of the communication terminal apparatus 100 that performs a voice communication via the mobile communication network 200 to be measured, or the like. The foregoing moving speed of the communication terminal apparatus 100 may be used for identifying, for example, a cause of quality deterioration of voice communication.

The network information is a connected network type used for performing the voice communication, base-station information and wireless channel quality information that are exemplified in the foregoing Table 2, roaming information, or the like. In the description herein, for example, in the case of voice communication in compliance with the communication standards of LTE (Long Term Evolution), a physical cell ID, a cell ID, area information, etc. are exemplified as the base-station information, and an RSSI (Received Signal Strength Indicator), an RSRP (Reference Signal Received Power), a SNR (Signal-Noise Ratio), a CQI (Channel Quality Indicator), etc. are exemplified as the wireless channel quality information. In the case of voice communication in compliance with the communication standards (IMT-2000: International Mobile Telecommunication 2000) of 3G (3rd Generation), a physical cell ID, a cell ID, area information, RNC (Radio Network Controller) information, etc. are exemplified as the base-station information, and an RSSI (Received Signal Strength Indicator), an RSCP (Received Signal Code Power), a BER (Bit Error Rate), etc. are exemplified as the wireless channel quality information.

When receiving the foregoing file of received voice data, information on presence or absence of communication disconnection during receiving the test signal and other additional information, the delivery and analysis server 420 decodes the received voice data by a voice decoder corresponding to the predetermined compression-encoding scheme, and converts from the file of received voice data to a recorded audio file (voice file) with a predetermined format (for example, WAV format) of a received test signal including a received voice signal. Then, the delivery and analysis server 420 compares the foregoing the received voice signal in the recorded audio file with a voice signal within the voiced period Tb in the sound source file, and calculates and stores a MOS value being as an evaluation value of voice communication quality based on the comparison result. Furthermore, the delivery and analysis server 420 determines presence or absence of communication disconnection in the second silent period Tc of the received test signal. For example, it is determined that there is no communication disconnection of voice communication in the case that the received test signal includes the end-identification signal 702, and it is determined that there is a communication disconnection of voice communication in the case that the received test signal does not include the end-identification signal 702 (refer to FIG. 2B).

The delivery and analysis server 420 stores the file of received voice data received from the communication terminal apparatus 100 and the information on presence or absence of communication disconnection during receiving the test signal, the evaluation result of voice communication quality including the evaluation value (MOS value) of voice communication quality and the determination result of dropped-call, and the foregoing additional information, by being associated with each other.

As described above, according to the example in FIG. 3, by performing the automatic transmission from the communication terminal apparatus 100 to the automatic voice response apparatus 410 at the predetermined voice communication quality evaluation timing set in advance, it is capable of evaluating the presence or absence of a dropped-call as well as the voice communication quality in the mobile communication network 200. Furthermore, it is not necessary to request any special operation for the voice communication quality evaluation to a user of the communication terminal apparatus 100 in performing the voice communication quality evaluation.

Moreover, according to the example in FIG. 3, since the data transmitted to the delivery and analysis server 420 from the communication terminal apparatus 100 that receives the test signal is the received voice data encoded by a predetermined scheme for the test signal, data amount transmitted via the communication network can be reduced compared to the case of transmitting a recorded audio file (for example, WAV file) created by recording the received signal of test signal or a recorded audio file with compression format (for example, zip, bz2, gz format) created by compressing the recorded data. Accordingly, it is capable of suppressing load of the communication network when measuring the voice communication quality.

Figure 4:
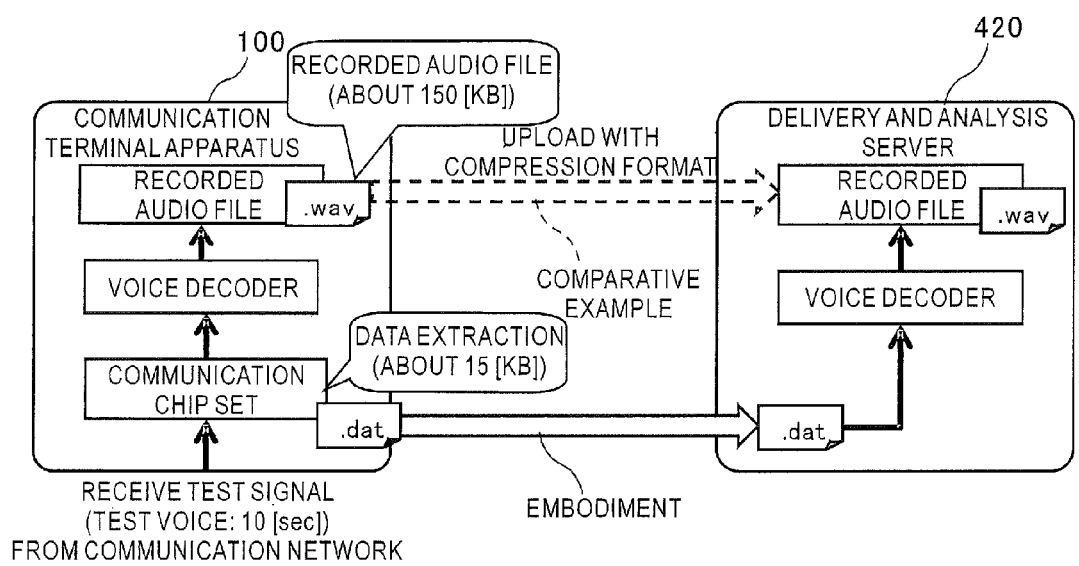
FIG. 4 is a schematic diagram of a more concrete example of the voice communication quality evaluation in the communication system according to the present embodiment.

FIG. 4 is a schematic diagram of a more concrete example of the voice communication quality evaluation in the communication system according to the present embodiment. In FIG. 4, a comparative example of voice communication quality evaluation is also shown.

In an example of the present invention in FIG. 4, the communication terminal apparatus 100 receives a test signal including a test voice for ten seconds from the voice communication quality evaluation system 400 via the mobile communication network 200 and the fixed-telephone network 300. By the communication chip set, a received voice data corresponding to the test voice in the test signal is extracted from the received signal as a received voice data (digital signal) encoded by the predetermined compression-encoding scheme and a file (extension: .dat) of the received voice data with size of about 15 [KB] is created. In the description herein, in the case of using GSM (registered trademark) AMR Codec/ACELP compression (4.75 [kbps]-12.2 [kbps]) as the foregoing compression-encoding scheme, the theoretical value of file size of the received voice data is about 15 [KB]. This file (about 15 [KB]) of received voice data is transmitted to the delivery and analysis server 420 via the mobile communication network 200. In the delivery and analysis server 420, the received voice data is decoded by the voice decoder corresponding to the predetermined compression-encoding scheme, and the file of received voice data is converted to a recorded audio file (voice file) of WAV format. This recorded audio file of WAV format is used for calculating an evaluation value of voice communication quality.

On the other hand, in the comparative example in FIG. 4, the received voice data outputted from the communication chip set is decoded by the voice decoder corresponding to the predetermined compression-encoding scheme in the communication terminal apparatus 100 and a voice reproduction is performed with the received voice data by a voice reproduction apparatus in a high-order layer. During the voice reproduction with the received voice data, the reproduced voice is recorded by using API (Audio Manager) in the standards of Android (registered trademark) and a recorded audio file of WAV format with size of about 157 [KB] is created. The recorded audio file of WAV format (about 157 [KB]) is transmitted to the delivery and analysis server 420 via the mobile communication network 200. It is alternatively considered that the recorded audio file of WAV format is compressed by a known compression scheme and transmitted to the delivery and analysis server 420 via the mobile communication network 200. The file size (compression scheme: bz2) after the compressing process in this case is about 45.5 [KB]. This file (compression scheme: bz2) with size of about 45.5 [KB] after the compressing process is transmitted to the delivery and analysis server 420 via the mobile communication network 200.

Table 4 shows sizes [KB] of files transmitted to the delivery and analysis server 420 via the mobile communication network 200 in the example of the present invention and comparative example. The reduction ratio in Table 4 is a value on the basis of the size of recorded audio file of WAV format in the comparative example and indicates how much percentage of the recorded audio file of WAV format can be reduced.

TABLE 4

| | File size [KB] | Reduction ratio |
|---|---|---|
| Comparative example 1 Recorded audio file (wav) | 157 | — |
| Comparative example 2 Compressed file (bz2) | 45.5 | 70% |
| Embodiment | 15 | 90% |

As shown in Table 4, in the embodiment, the reduction ratio of size of the file transmitted to the delivery and analysis server 420 via the mobile communication network 200 can be 90% compared with the case of transmitting the recorded audio file of WAV format in the comparative example. That is, the data amount to be transmitted to the delivery and analysis server 420 via the mobile communication network 200 can be about one-tenth of that in the comparative example. Compared with this, the reduction ratio of file size in the case of the file (compression scheme: bz2) created by performing compression for the recorded audio file of WAV format. is about 70%.

It is noted, in the aforementioned embodiments, the delivery and analysis server 420 of the voice communication quality evaluation system 400 may transmit schedule information of the foregoing voice communication quality evaluation timing to the communication terminal apparatus 100. In this case, the communication terminal apparatus 100 receives the schedule information from the voice communication quality evaluation system 400 and performs an outgoing call to the voice communication quality evaluation system 400 at a predetermined voice communication quality evaluation timing designated by the received schedule information.

Furthermore, the delivery and analysis server 420 may be configured with a plurality of servers. For example, a delivery server of delivering the schedule information of voice communication quality evaluation timing and an analysis server of performing various processes relating to the evaluation of voice communication quality may be provided separately.

The foregoing schedule information may be changed based on at least one of terminal identification information (for example, telephone number) of the communication terminal apparatus 100, a communication history of the communication terminal apparatus 100, a model of the communication terminal apparatus 100, a current location (GPS position, area, existing cell ID, etc.) of the communication terminal apparatus 100, time zone (a weekday/holyday, day of week, early morning/daytime/nighttime), a moving speed (for example, resting, low speed during moving on foot, high speed during moving by car, train or the like) of the communication terminal apparatus 100, information on a communications service provider of the mobile communication network 200, information on a communications service provider contracted for the communication terminal apparatus 100 and wireless channel quality information (for example, receiving SINR, RSSI, RSRP, CQI) exemplified in the foregoing Table 2.

For example, when it is determined that the communication terminal apparatus 100 locates in an event site of a festival, a display of fireworks, etc. where many communication terminal apparatuses exist around there with high probability, based on the information of current location of the communication terminal apparatus 100, the foregoing schedule information may be changed so as to cancel the voice communication quality evaluation process or restrict the number of the voice communication quality evaluation processes in the time zone during the course of the event. In the case that the moving speed of communication terminal apparatus 100 is high speed that is higher than a predetermined threshold such as the case of moving by a train or the like, the foregoing schedule information may be changed so as to cancel the voice communication quality evaluation process.

Further, the present system may be configured so as to have an automatic learning function of sequentially learning and updating the foregoing schedule information for each of the communication terminal apparatus 100, and the voice communication quality evaluation timing at which the evaluation recently performed may be preferentially set as a next voice communication quality evaluation timing for each of the communication terminal apparatus 100.

By setting and changing the foregoing schedule information, for example, voice communication quality evaluation (MOS value, presence or absence of a dropped-call) for the communication terminal apparatus that satisfies the condition (current location, moving speed) determined in advance can be performed.

Furthermore, with respect to the foregoing schedule information, a voice communication quality evaluation timing may be randomly set.

It is noted that process steps and configuration elements in each of the communication terminal apparatus 100, the automatic voice response apparatus 410, the delivery and analysis server 420, the contents providing server 600, etc. described in the present specification can be implemented with various means as well as the aforementioned means. For example, these process steps and configuration elements may be implemented with hardware, firmware, software, or a combination thereof.

With respect to hardware implementation, means such as processing units or the like used for establishing the foregoing steps and configuration elements in entities (for example, various wireless communication apparatuses, Node B, communication terminal apparatus, server, gateway, switching equipment, computer, hard disk drive apparatus, or optical disk drive apparatus) may be implemented in one or more of an application-specific IC (ASIC), a digital signal processor (DSP), a digital signal processing device (DSPD), a programmable logic device (PLD), a field programmable gate array (FPGA), a processor, a controller, a microcontroller, a microprocessor, a electronic device, other electronic unit, computer, or a combination thereof, which are designed so as to perform a function described in the present specification.

With respect to the firmware and/or software implementation, means such as processing units or the like for establishing the foregoing configuration elements may be implemented with a program (for example, a code such as a procedure, a function, a module, an instruction, etc.) for performing a function described in the present specification. In general, any computer/processor readable medium of materializing the code of firmware and/or software may be used for implementation of means such as processing units and so on for establishing the foregoing steps and configuration elements described in the present specification. For example, in a control apparatus, the firmware and/or software code may be stored in a memory and executed by a computer or processor. The memory may be implemented within the computer or processor, or outside the processor. Further, the firmware and/or software code may be stored in, for example, a medium capable being read by a computer or processor, such as a random-access memory (RAM), a read-only memory (ROM), a non-volatility random-access memory (NVRAM), a programmable read-only memory (PROM), an electrically erasable PROM (EEPROM), a FLASH memory, a floppy (registered trademark) disk, a compact disk (CD), a digital versatile disk (DVD), a magnetic or optical data storage unit, or the like. The code may be executed by one or more of computers and processors, and a certain aspect of functionalities described in the present specification may be executed by a computer or processor.

The description of embodiments disclosed in the present specification is provided so that the present disclosures can be produced or used by those skilled in the art. Various modifications of the present disclosures will be readily apparent to those skilled in the art and general principles defined in the present specification can be applied to other variations without departing from the spirit and scope of the present disclosures. Therefore, the present disclosures should not be limited to examples and designs described in the present specification and should be recognized to be in the broadest scope corresponding to principles and novel features disclosed in the present specification.

REFERENCE SIGNS LIST 100 communication terminal apparatus
200 mobile communication network
210 base station
300 fixed-telephone network
400 voice communication quality evaluation system
410 automatic voice response apparatus
420 delivery and analysis server
500 Internet
510 access-point apparatus of wireless LAN
600 contents providing server
700 test signal
701 test signal
702 end-identification signal

The invention claimed is:

1. A communication system comprising a communication terminal apparatus and a voice communication quality evaluation system for communicating with the communication terminal apparatus via a communication network:
wherein the voice communication quality evaluation system comprises
sound source file memory means of memorizing a sound source file of a test signal for voice communication quality evaluation,
test signal transmitting means of transmitting the test signal to the communication terminal apparatus via the communication network,
data receiving means of receiving from the communication terminal apparatus a received voice data encoded by a predetermined compression-encoding scheme for the test signal received with the communication terminal apparatus,
signal generating means of generating a received voice signal from the received voice data received from the communication terminal apparatus, and
calculating means of calculating an evaluation value of quality of voice communication between the voice communication quality evaluation system and the communication terminal apparatus by comparing the received voice signal with the test signal before transmitting; and wherein the communication terminal apparatus comprises
test signal receiving means of receiving the test signal from the voice communication quality evaluation system via the communication network,
means of extracting a received voice data in which a part corresponding to a test voice of the test signal is encoded by the predetermined compression-encoding scheme, from a received signal received from the voice communication quality evaluation system, and
received voice data transmitting means of transmitting to the voice communication quality evaluation system the received voice data encoded by the predetermined compression-encoding scheme via the communication network.

2. The communication system according to claim 1, wherein the communication terminal apparatus further comprises means of downloading contents from a contents providing server under a condition without a communication interruption for the test signal in the communication terminal apparatus.

3. The communication system according to claim 1,
wherein the communication terminal apparatus further comprises outgoing call means of performing an outgoing call of voice communication to the voice communication quality evaluation system via the communication network, and
wherein the foregoing voice communication quality evaluation system transmits the test signal to the communication terminal apparatus in response to the outgoing call from the communication terminal apparatus.

4. The communication system according to claim 3,
wherein the voice communication quality evaluation system further comprises schedule information transmitting means of transmitting to the communication terminal apparatus a schedule information for the outgoing call in the communication terminal apparatus, and
wherein the communication terminal apparatus further includes schedule information receiving means of receiving the schedule information from the voice communication quality evaluation system and performs the outgoing call to the voice communication quality evaluation system based on the schedule information received from the voice communication quality evaluation system.

5. The communication system according to claim 1, wherein the voice communication quality evaluation system transmits the test signal by performing an outgoing call to the communication terminal apparatus based on a schedule information set in advance.

6. The communication system according to claim 4, wherein the voice communication quality evaluation system further comprises means of changing the schedule information based on at least one of a terminal identification information of the communication terminal apparatus, a communication history of the communication terminal apparatus, a model of the communication terminal apparatus, a current location of the communication terminal apparatus, a time zone, a moving speed of the communication terminal apparatus, information on a communications service provider of the communication network, information on a communications service provider contracted for the communication terminal apparatus and network information in the communication terminal apparatus.

7. The communication system according to claim 1,
wherein the communication terminal apparatus further comprises additional information transmitting means of transmitting to the voice communication quality evaluation system an additional information relating to at least one of the communication terminal apparatus, the communication network and the voice communication quality evaluation, and wherein the voice communication quality evaluation system receives the at least one additional information from the communication terminal apparatus and memorizes the result of voice communication quality evaluation including the evaluation value of voice communication quality and the additional information relating to the at least one by being associated with each other.

8. The communication system according to claim 1, wherein the voice communication quality evaluation system memorizes two or more types of sound source files of test signals, selects a test signal to be transmitted from the two or more types of test signals and transmits the selected test signal to the communication terminal apparatus.

9. The communication system according to claim 8, wherein the voice communication quality evaluation system selects the test signal to be transmitted from the two or more types of test signals based on at least one of a terminal identification information of the communication terminal apparatus, a communication history of the communication terminal apparatus, a model of the communication terminal apparatus, a current location of the communication terminal apparatus, a time zone, a moving speed of the communication terminal apparatus, information on a communications service provider of the communication network, information on a communications service provider contracted for the communication terminal apparatus and network information in the communication terminal apparatus.

10. The communication system according to claim 1, wherein a presence or absence of a dropped-call of the voice communication is determined based on a presence or absence of a reception interruption for the test signal.

11. The communication system according to claim 1, wherein the test signal has an end discriminating signal at a tail end thereof and a presence or absence of a dropped-call of voice communication is determined based on a presence or absence of the end discriminating signal in the test signal.

12. A communication method for evaluating a quality of voice communication, comprising:

transmitting a test signal for voice communication quality evaluation to a communication terminal apparatus from a voice communication quality evaluation system via a communication network;

receiving the test signal from the communication terminal apparatus via the communication network by the communication terminal apparatus;

extracting a received vice data in which a part corresponding to a test voice of the test signal is encoded by the predetermined compression-encoding scheme, from a received signal received from the voice communication quality evaluation system, by the communication terminal apparatus;

transmitting the received voice data encoded by the predetermined compression-encoding scheme, from the communication terminal apparatus to the voice communication quality evaluation system via the communication network;

receiving from the communication terminal apparatus the received voice data encoded by the predetermined compression-encoding scheme for the test signal received with the communication terminal apparatus, by the voice communication quality evaluation system;

generating a received voice signal from the received voice data received from the communication terminal apparatus in the voice communication quality evaluation system; and calculating an evaluation value of quality of voice communication between the voice communication quality evaluation system and the communication terminal apparatus by comparing the received voice signal with the test signal before transmitting in the voice communication quality evaluation system.

13. The communication system according to claim 5, wherein the voice communication quality evaluation system further comprises means of changing the schedule information based on at least one of a terminal identification information of the communication terminal apparatus, a communication history of the communication terminal apparatus, a model of the communication terminal apparatus, a current location of the communication terminal apparatus, a time zone, a moving speed of the communication terminal apparatus, information on a communications service provider of the communication network, information on a communications service provider contracted for the communication terminal apparatus and network information in the communication terminal apparatus.

14. A system for evaluating a quality of voice communication, the system comprising a communication terminal apparatus, a voice apparatus and a server:

wherein the voice apparatus memorizes a sound source file of a test signal for voice communication quality evaluation and transmits the test signal to the communication terminal apparatus via the communication network;

wherein the server receives from the communication terminal apparatus a received voice data encoded by a predetermined compression-encoding scheme for the test signal received with the communication terminal apparatus, generates a received voice signal from the received voice data received from the communication terminal apparatus, and calculates an evaluation value of quality of voice communication between the voice apparatus and the communication terminal apparatus by comparing the received voice signal with the test signal before transmitting; and wherein the communication terminal apparatus receives the test signal from the voice apparatus via the communication network, extracts a received voice data in which a part corresponding to a test voice of the test signal is encoded by the predetermined compression-encoding scheme, from a received signal received from the voice apparatus, and transmits to the server the received voice data encoded by the predetermined compression-encoding scheme via the communication network.

* * * * *

UNITED STATES PATENT AND TRADEMARK OFFICE
CERTIFICATE OF CORRECTION

PATENT NO. : 9,826,086 B2
APPLICATION NO. : 14/427443
DATED : November 21, 2017
INVENTOR(S) : Liang Zhang et al.

Page 1 of 1

It is certified that error appears in the above-identified patent and that said Letters Patent is hereby corrected as shown below:

On the Title Page

The listing of Applicant should read:
(71) Applicant: SOFTBANK CORP., Tokyo (JP)

Signed and Sealed this
Thirteenth Day of February, 2018

Andrei Iancu
*Director of the United States Patent and Trademark Office*